United States Patent [19]

Phillips

[11] Patent Number: 4,904,144
[45] Date of Patent: Feb. 27, 1990

[54] TRUCK DUMPING AND UNLOADING APPARATUS

[76] Inventor: Kirk A. Phillips, 2300 Briar W. Blvd. #3701, Houston, Tex. 77077

[21] Appl. No.: 294,421

[22] Filed: Jan. 9, 1989

[51] Int. Cl.$^4$ .............................................. B65G 67/24
[52] U.S. Cl. .................... 414/383; 414/388; 414/479; 414/494; 414/500
[58] Field of Search ............... 414/500, 469, 474–479, 414/491, 494, 510, 519–520, 387, 349, 350, 373, 376, 386, 387, 390, 400, 383, 384, 388, 389

[56] References Cited

U.S. PATENT DOCUMENTS

| | | | |
|---|---|---|---|
| 1,329,392 | 2/1920 | Ford | 414/389 X |
| 2,820,560 | 1/1958 | Davis | 414/400 X |
| 2,823,818 | 2/1958 | Chastain et al. | 414/494 |
| 3,330,432 | 7/1967 | Blackburn et al. | 414/494 |
| 3,443,703 | 5/1969 | Matsumoto | 414/510 X |
| 4,020,961 | 5/1977 | Musgrove | 414/500 X |
| 4,655,671 | 4/1987 | Pratt | 414/498 X |

Primary Examiner—Robert J. Spar
Assistant Examiner—Keith L. Dixon
Attorney, Agent, or Firm—John M. Harrison

[57] ABSTRACT

A truck dumping and unloading apparatus which is operated by reverse truck motion and is adapted for mounting on a flatbed truck or a pick-up truck. The apparatus includes a single or double-member, open-top sled having at least a primary compartment adapted for containing trash, garbage or refuse, a sled guide mounted on the back of the truck for receiving a cable, one end of which cable is attached to the sled and a traveling block adapted for traveling on the opposite end of the cable and receiving a pair of tire chains or friction mats for deployment beneath the rear wheels of the truck. Operation of the truck rearwardly and traversal of the tire chains or friction mats by the rear truck tires causes the traveling block to traverse the cable and the sled to slide from the truck bed and dump the trash, garbage, bulk materials or refuse, reponsive to tension applied to the cable by the travelling block.

20 Claims, 4 Drawing Sheets

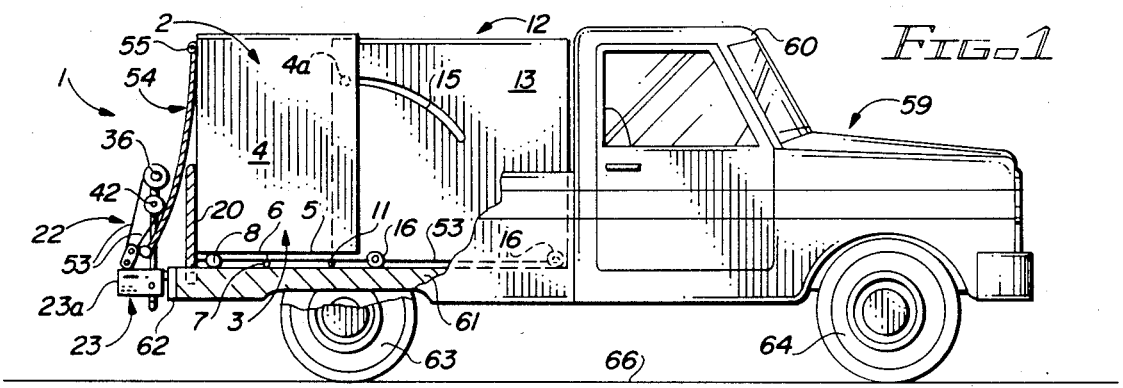
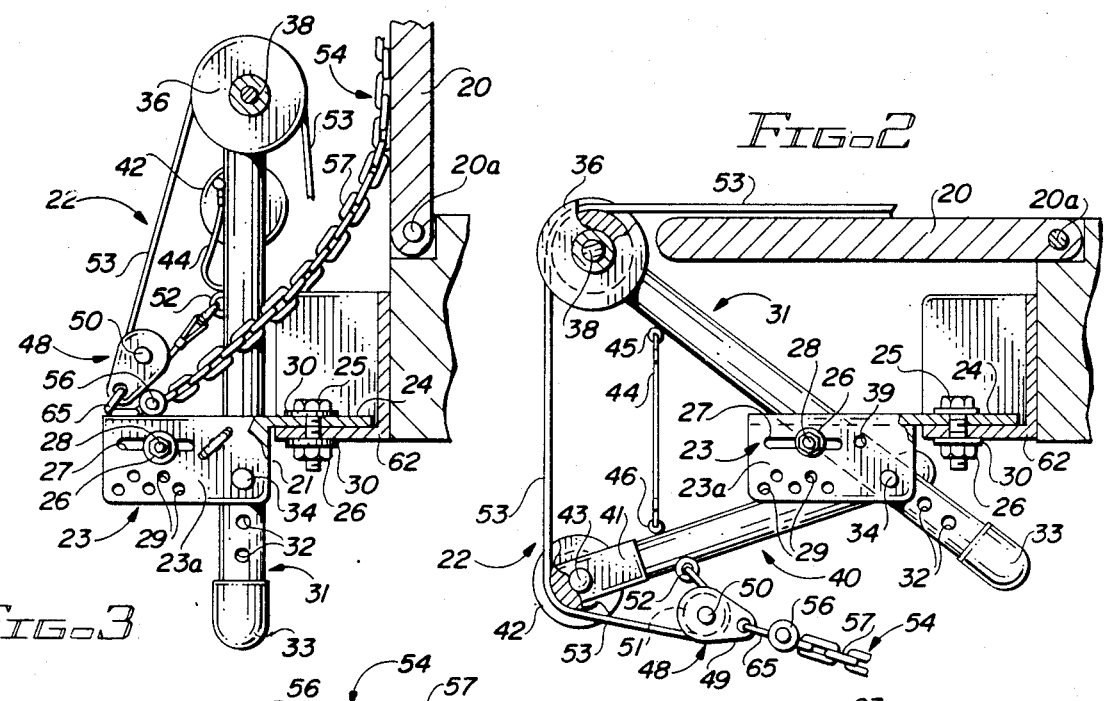
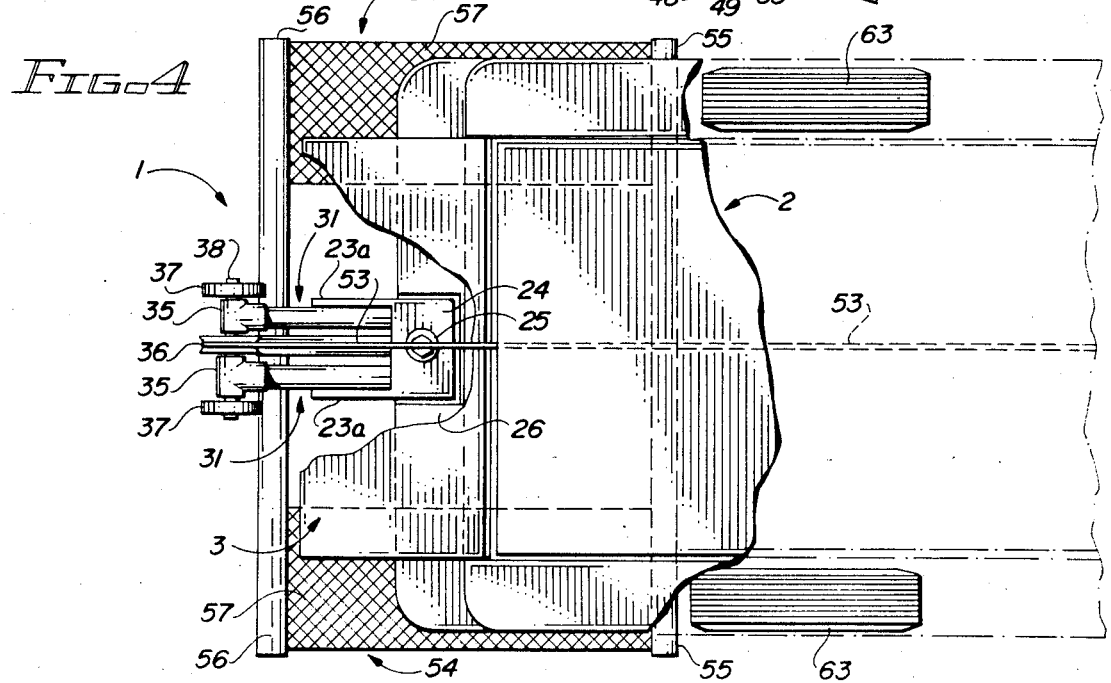

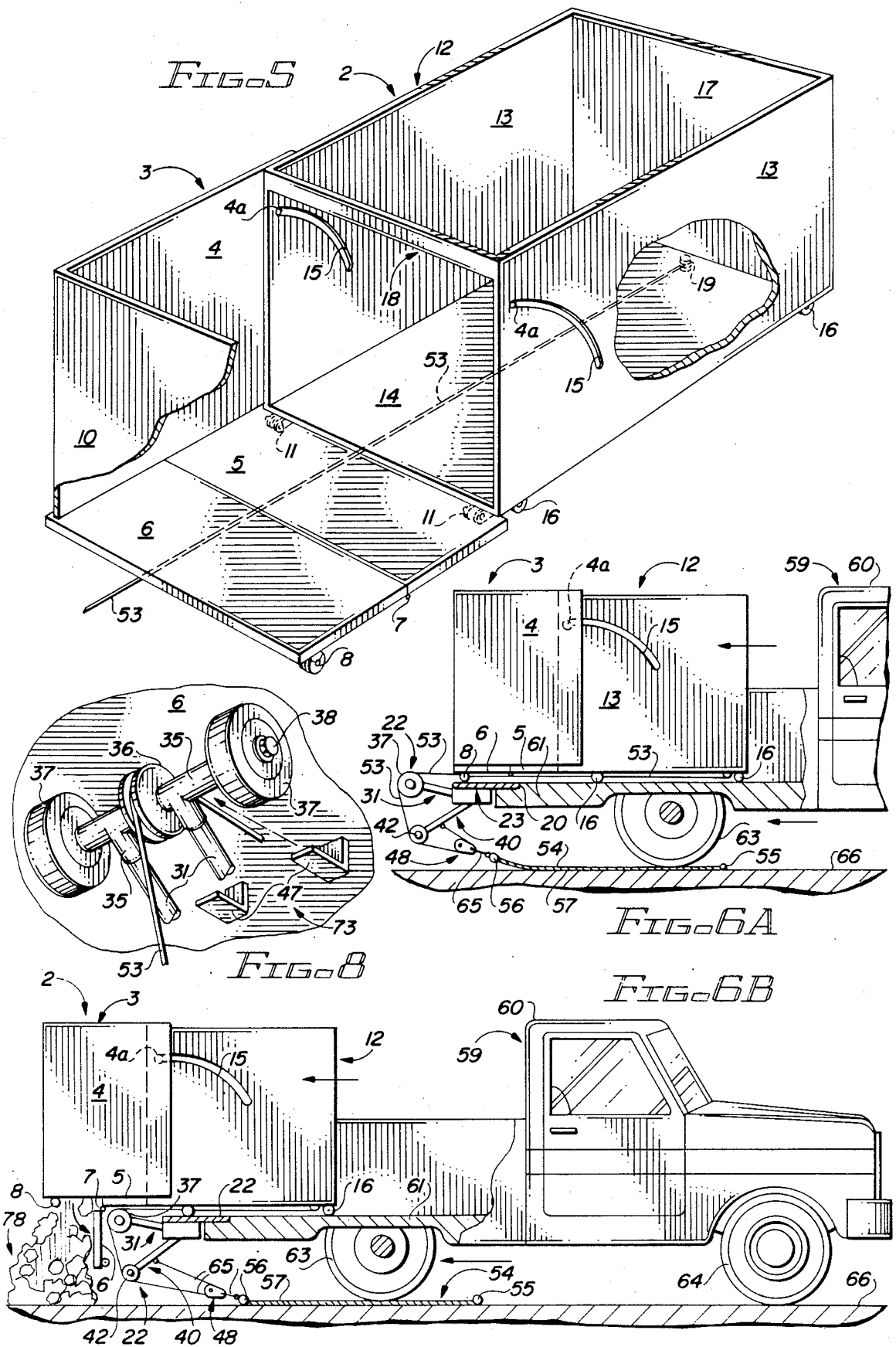

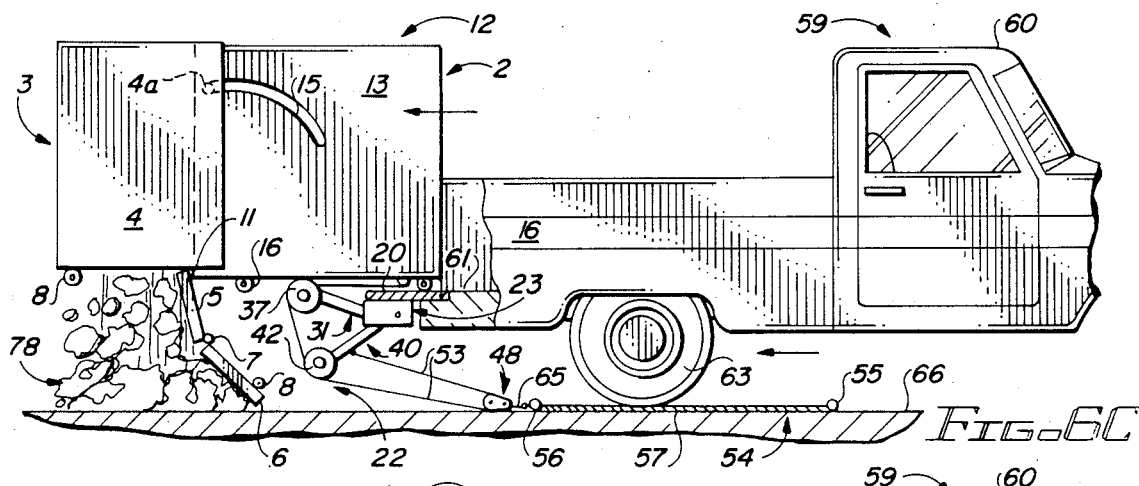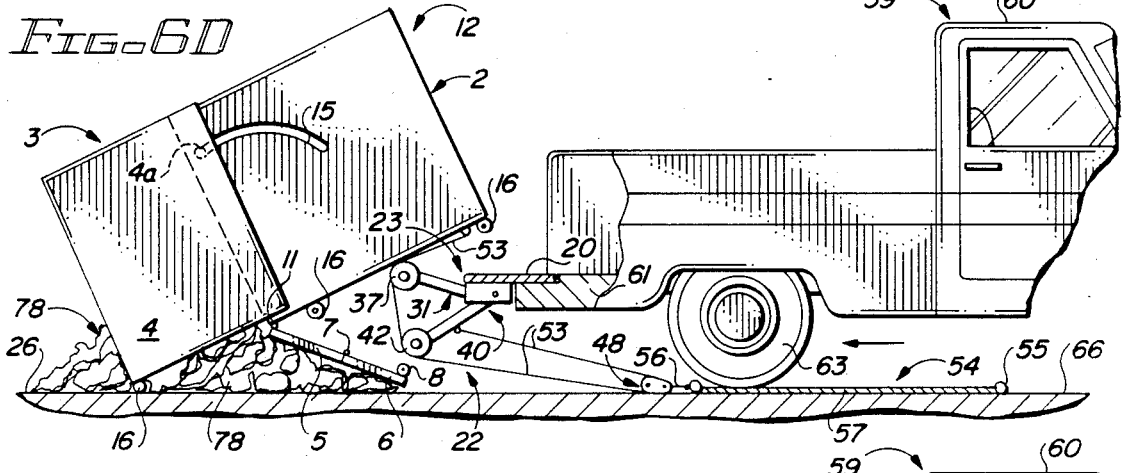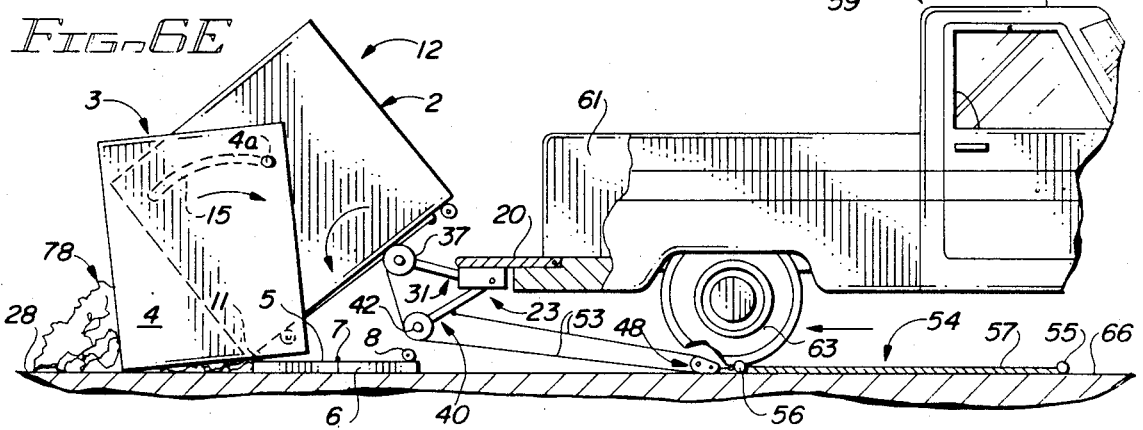

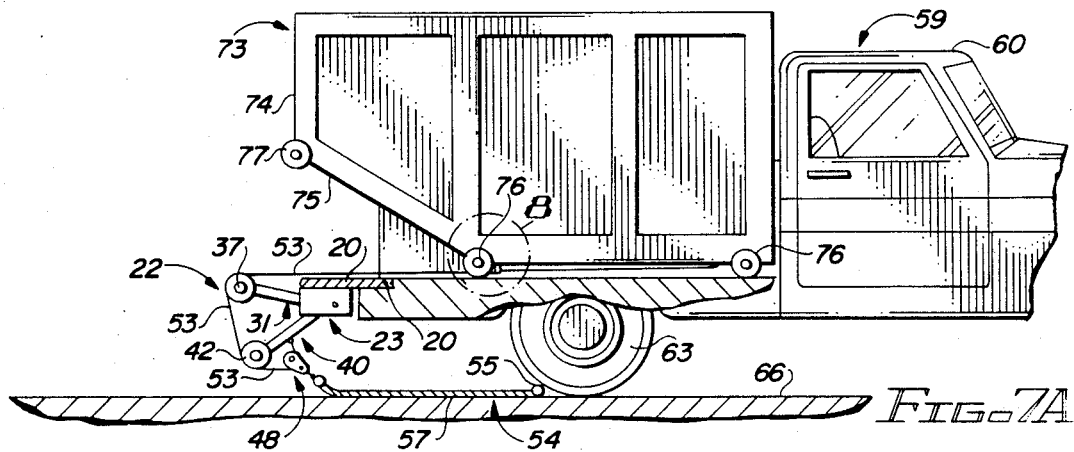
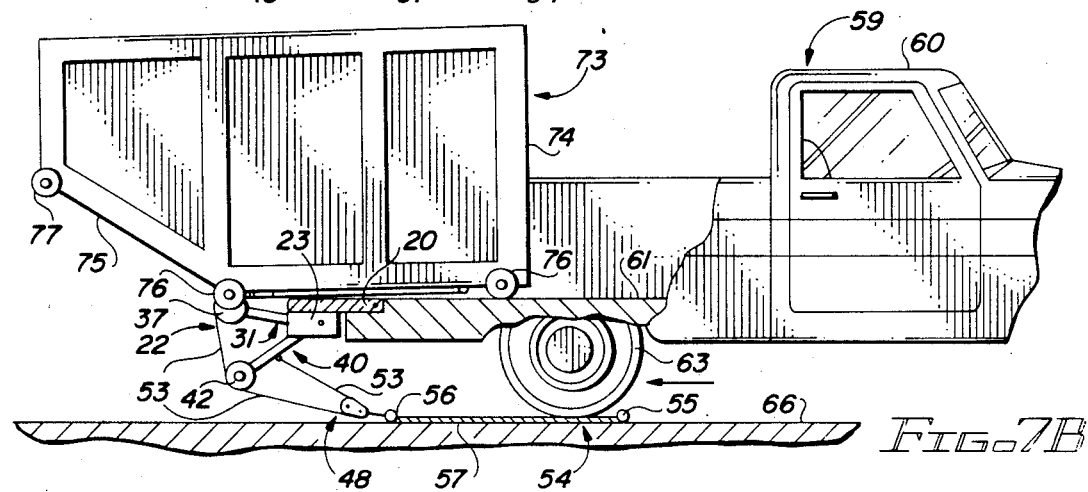
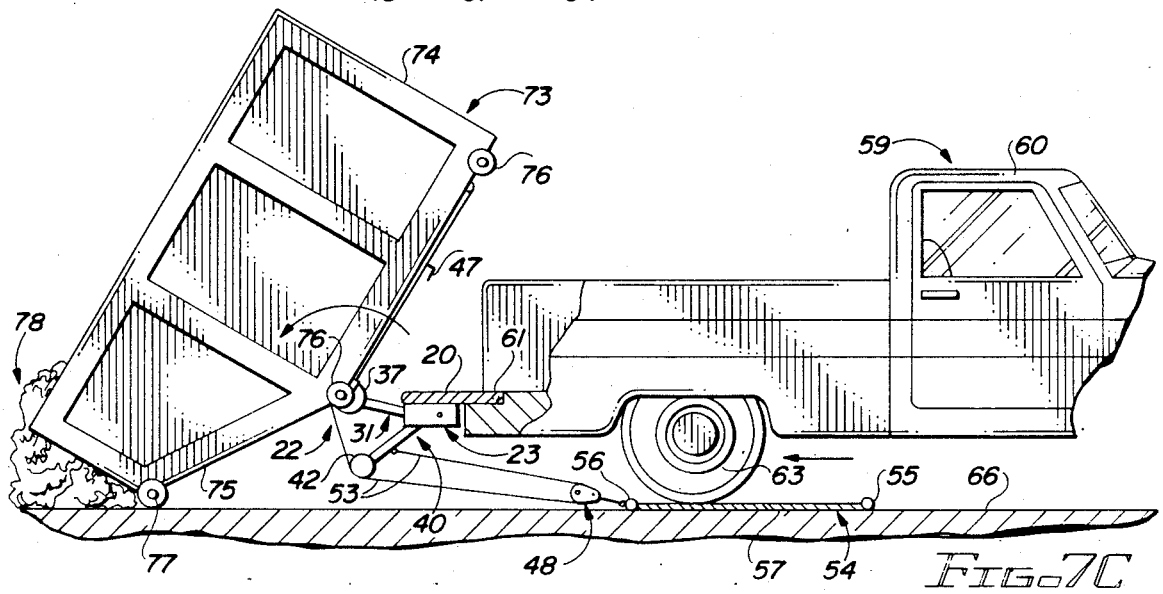

TRUCK DUMPING AND UNLOADING APPARATUS

BACKGROUND OF THE INVENTION

Field of the Invention

This invention relates to devices for automatically unloading trash, garbage or refuse from a truck. More particularly, the invention relates to a truck dumping apparatus which is characterized by a single or double-member sled having an articulated bottom or frontal opening and mounted on the bed of a flatbed or pick-up truck. A cable extends from attachment to the cab end of the sled, to a sled guide which is pivotally attached to the truck and receives a traveling block which travels on the cable and is secured to a pair of spaced tire chains for deployment beneath the rear wheels of the truck. Operation of the truck in reverse gear causes the rear wheels to traverse the tire chains and pull the sled from the truck bed responsive to movement of the cable through the traveling block. As the sled tilts from the truck bed, the articulated bottom or front opening allows the contained trash, garbage or refuse to empty from the sled. Operation of the truck in the forward direction allows the sled to be manually repositioned on the truck bed, the tire chains to be deployed on the rear of the truck and the sled guide to be folded upwardly, to present the truck in traveling configuration.

One of the problems realized in dumping trash, garbage and refuse from the beds of pick-up trucks and flatbed trucks is that of physically moving the material from the truck to the dump site. In most cases, this is achieved by manual labor, using shovels or other tools to slide the material from the truck bed to the ground behind the truck. The procedure is both expensive and time-consuming, since at least one laborer must be present in order to accomplish the task.

Various apparatus are known in the art for discharging cargo from a truck bed by displacing a container or a support for the load from the truck. In most cases, winches and other cable-related devices are normally used to accomplish moving of the container or support rearwardly of the truck. Early U.S. Pat. No. 154,704, dated Sept. 1, 1874 to J. Mills, is entitled "Dumping-Wagons". The patent discloses a wagon having a wagon bed with a hinged inclined portion and a cart which is mounted by means of rollers on the bed of the wagon. The cart can be lowered down the inclined portion of the bed using a cable and winch system, in order to load and unload various products carried in the cart. U.S. Pat. No. 1,404,069, dated Jan. 17, 1922, to D. E. Swinehart, details a "Loading and Unloading Truck". Like the "Dumping-Wagons" patent, the Loading and Unloading truck includes a truck bed fitted with a pivoting container which is operated by means of a cable and multiple rollers mounted on the truck bed. When the container needs to be unloaded, it is disposed rearwardly of the truck bed to the approximate midpoint of the container at a point of pivot where the container is pivoted downwardly for unloading purposes. The container is then retracted into its original traveling position, using the cable. U.S. Pat. No. 1,567,478, dated Dec. 29, 1925, to E. Vonnez, et al, details a "Loading Device for Vehicles". The loading device is characterized by a movable carriage adapted for loading and unloading on the bed of a truck by means of a cable and winch mechanism. A "Self-Loading and Unloading Truck" is detailed in U.S. Pat. No. 2,508,740, dated May 23, 1950, to N. F. Alvare. In this patent, a skid is mounted by means of a cable on the back or bed of a truck which is designed to be loaded and unloaded from the bed by operation of the cable. U.S. Pat. No. 2,808,159, dated Oct. 1, 1957, to C. E. Beltran Simo, details a "Movable Platform for Self-Unloading Vehicles". The platform is articulated, in order to facilitate loading and unloading from the bed of a truck and is driven by means of gears to the unloaded and loaded configurations, respectively. A "Truck Having Removable Body" is detailed in U.S. Pat. No. 2,811,269, dated Oct. 29, 1957, to F. P. Anderson, et al. The removable body is movably supported by a bed or chassis and is maneuvered into and out of the bed by means of a chain and sprocket system, in combination with a system of cables.

The above innumerated art details several load-carrying devices which use winch and cable systems, as well as chain drive mechanisms, to accomplish movement of a container or support to and from a stationary truck bed. However, it is an object of this invention to provide a new and improved truck dumping and unloading apparatus which is operated by displacing a refuse, garbage, trash or load-carrying container rearwardly of the truck by reverse operation of the truck itself.

Another object of this invention is to provide a truck dumping and unloading apparatus which is characterized by an open-top, single or double-member sled mounted on the bed of a truck and a sled guide fixedly attached to the rear of the truck, with a cable extending from the bottom of the double-member sled around the sled guide to a pair of tire chains or friction mats wherein the sled can be displaced from the truck bed by reverse operation of the truck.

A still further object of this invention is to provide a new and improved truck dumping or unloading apparatus which is characterized by a single or double-compartment, open-top sled mounted by means of rollers on the bed of a pick-up truck or flatbed truck, a sled guide provided with a pair of spaced pulleys pivotally fixed to the rear of the truck, a cable having one end attached to the cab end of the sled and extending around the pulleys in the sled guide and the opposite end receiving a traveling block, with a pair of tire chains or friction mats attached to the traveling block, such that the sled may be dumped or unloaded from the bed of the truck by operation of the truck rearwardly as the rear tires of the truck traverse the parallel tire chains or friction mats.

SUMMARY OF THE INVENTION

These and other objects of the invention are provided in a new and improved truck dumping and/or unloading apparatus which includes a single or double-member sled slidably mounted on the bed of a pick-up truck or a flatbed truck, a sled guide rigidly or pivotally attached to the rear of the truck and a pair of pulleys pivotally carried by the sled guide in spaced relationship, a cable having one end attached to the cab end of the sled and extending between the sled and the truck bed around the pulleys in the sled guide, with the opposite end of the cable attached to the sled guide, a traveling block carried by the cable in slidable relationship and a pair of tire chains or friction mats attached to the traveling block and disposed in parallel alignment with the rear wheels of the truck, such that the sled is displaced from the bed of the truck responsive to reverse operation of the truck and rearward travel of the rear tires along the tire chains or friction mats.

BRIEF DESCRIPTION OF THE DRAWINGS

The invention will be better understood by reference to the accompanying drawings, wherein:

FIG. 1 is a perspective view of a first preferred embodiment of the truck dumping and unloading apparatus in fully loaded, traveling configuration on a pick-up truck;

FIG. 2 is a side sectional view of the deployed sled guide element of the truck dumping and unloading apparatus illustrated in FIG. 1;

FIG. 3 is a side sectional view of the sled guide element configured in folded, travel position as illustrated in FIG. 1;

FIG. 4 is a top elevation, partially in section, of the rear end of the pick-up truck and the deployed sled guide illustrated in FIG. 2;

FIG. 5 is a perspective view, partially in section, of a double-member sled having an articulated bottom, for use in the first preferred embodiment of the truck dumping and unloading apparatus illustrated in FIG. 1;

FIG. 6A is a side elevation of the truck dumping and unloading apparatus illustrated in FIG. 1, with the double member sled illustrated in FIG. 2 displaced rearwardly in a first dumping step, responsive to rearward travel of the truck;

FIG. 6B is a side elevation of the truck dumping and unloading apparatus illustrated in FIG. 6A, with the double-member sled 2 further displaced with respect to the bed of the truck in a second step;

FIG. 6C is a side elevation of the truck dumping and unloading apparatus illustrated in FIGS. 6A and 6B, with the double-member sled still further rearwardly displaced responsive to reverse operation of the truck, but still in horizontal configuration on the truck bed, with the articulated bottom open, in a third step;

FIG. 6D is a side elevation of the truck dumping and unloading apparatus illustrated in FIG. 6C, wherein the double-member sled is tilted downwardly in a fourth step, with one edge of the sled touching the ground and the articulated bottom fully open;

FIG. 6E is a side elevation of the truck dumping and unloading apparatus illustrated in FIG. 6D, more particularly illustrating displacement of the primary compartment with respect to the secondary compartment of the double-member sled, for further dumping, in a last step;

FIG. 7A is a side elevation of an alternative preferred embodiment of the truck dumping and unloading apparatus of this invention, with a single member sled loaded on the bed of the truck;

FIG. 7B is a side elevation of the truck dumping and unloading apparatus illustrated in FIG. 7A, with the single member sled displaced rearwardly in a first step pursuant to reverse operation of the truck;

FIG. 7C is a side elevation of the truck dumping and unloading apparatus illustrated in FIG. 7B, with the single member sled pivoted and tilted downwardly in contact with the ground in dumping configuration, in a second step; and FIG. 8 is an exploded bottom view of the parallel top arms, top pulley and top arm roller components of the sled guide element of the truck dumping and unloading apparatus of this invention.

DESCRIPTION OF THE PREFERRED EMBODIMENTS

Referring initially to FIGS. 1 and 5 of the drawings, the truck dumping and unloading apparatus of this invention is generally illustrated by reference numeral 1. The truck dumping and unloading apparatus 1 is mounted on a pick-up truck 59, having a conventional cab 60 on the front end thereof and a bed 61 extending rearwardly of the cab 60, with a tailgate 20 and a rear bumper 62, terminating the rear end of the bed 61. Rear tires 63 and front tires 64 support the truck 59 on a road surface 66. The truck dumping and unloading apparatus 1 includes a double-member sled 2, positioned on the bed 61 of the truck 59 and characterized by a primary compartment 3 and a secondary compartment 12, located adjacent to the primary compartment 3. The primary compartment 3 is further characterized by parallel primary compartment sides 4, with an inside bottom panel 5 and an outside bottom panel 6 spanning the primary compartment sides 4 at the bottom thereof, as illustrated in FIG. 5. The inside bottom panel 5 and the outside bottom panel 6 are pivotally joined to each other by means of a panel divider hinge 7 and the inside bottom panel 5 is hinged to the front edge of a secondary compartment bottom 14, by means of the spaced panel mount hinges 11. A pair of panel rollers 8 are attached to the outside bottom panel 6, as further illustrated in FIG. 5 and an optional primary compartment front 10 closes the front end of the primary compartment 3. Alternatively, the primary compartment front 10 may be omitted and the tailgate 20 used to retain trash or refuse in the primary compartment 3. In a most preferred embodiment of the invention, the primary compartment 3 is open at the top, in order to facilitate loading refuse, garbage or trash, illustrated by reference numeral 78, therein, as desired. The secondary compartment 12 is seated immediately forwardly of the primary compartment 3 and immediately rearwardly of the cab 60 of the truck 59, as further illustrated in FIG. 1. The secondary compartment 12 is characterized by a pair of parallel secondary compartment sides 13 and a compartment bottom 14, as further illustrated in FIG. 5. A pair of downwardly-curved, parallel slots 15 are provided in the secondary compartment sides 13 and a pair of pins 4a, which are secured to the primary compartment sides 4 of the primary compartment 3, extend through the slots 15, respectively, in order to attach the primary compartment 3 to the secondary compartment 12 in articulated fashion, as hereinafter further described. Four secondary compartment rollers 16 are fitted to the secondary compartment bottom 14 of the secondary compartment 12 at the corners thereof and serve to facilitate rolling engagement of the secondary compartment 12 with the bed 61 of the truck 59. The primary compartment 3 is likewise mounted on the bed 61 of the truck 59 in rolling relationship by means of the panel rollers 8, as heretofore noted. The secondary compartment 12 is closed at the rear thereof by means of a secondary compartment back 17 and communicates with the primary compartment 3 by means of a secondary compartment opening 18, as further illustrated in FIG. 5. A compartment mount cleat 19 extends downwardly from the secondary compartment bottom 14 adjacent to the secondary compartment back 17 approximately midway between the secondary compartment sides 13 and receives one end of a cable 53, which extends beneath and along the approximate centerline of the primary compartment 3 and the secondary compartment 12, as further illustrated in FIG. 5.

Referring now to FIGS. 1–3 of the drawings, and initially to FIGS. 1 and 2, a sled guide 22 is illustrated in folded, retracted, travel configuration at the rear of the bed 61 of the truck 59. In a preferred embodiment of the invention, the sled guide 22 is fixedly attached to the rear bumper 62 of the truck 59 by means of a mount plate 24, extending from a guide bracket 23, and a guide mount bolt 25, which projects through the mount plate 24 and the rear bumper 62 or alternatively, through a trailer hitch (not illustrated) mounted on the bumper 62. A nut 26 is threadably attached to the guide mount bolt 25 and is seated against a washer 30, for securing the sled guide 22 to the rear bumper 62 of the truck 59. The guide bracket 23 is further characterized by a pair of parallel bracket plates 23a, which extend from the mount plate 24 and are fitted with horizontally parallel adjusting slots 27, each of which receive an adjusting slot bolt 28 and a cooperating nut 26 is threaded on the corresponding adjusting slot bolt 28, as further illustrated in FIG. 3. Spaced guide bracket adjusting holes 29 are also provided in the respective bracket plates 23a in registering relationship. A pair of top arms 31 are pivotally attached near the bottom ends thereof to the parallel bracket plates 23a, respectively, by means of an arm pivot pin 34, which projects through registering openings (not illustrated) provided in the bracket plates 23a and through one of several spaced top arm adjusting holes 32, provided in the top arms 31, as further illustrated in FIGS. 2 and 3. An end cap 33 may be provided on each of the lower ends of the top arms 31, to protect the operator, if desired.

Referring now to FIGS. 2, 4 and 8 of the drawings, the sled guide 22 is deployed in operational configuration. In these illustrations, it is seen that a pair of arm extensions 35 are secured to the extending top ends of the top arms 31, respectively, and the arm extensions 35 are aligned in registering relationship to receive a common roller axle 38, in order to rotatably suspend a top pulley 36 between the two arm extensions 35, as further illustrated in FIGS. 4 and 8 of the drawings. A pair of top arm rollers 37, each having a diameter which is greater than the diameter of the top pulley 36, are also rotatably mounted on the roller axle 38 in spaced relationship, as further illustrated in FIGS. 4 and 8. The top arm rollers 37 are designed to receive the primary compartment 3 and the secondary compartment 12 of the double member sled 2 in sequence and thereby transfer the weight of these containers from the tailgate 20. Furthermore, the top arm rollers 37 may be retained on opposite ends of the roller axle 38 by means of washers and cotter pins or other retaining means (not illustrated), according to the knowledge of those skilled in the art. A bottom arm 40 is also pivotally attached to the spaced bracket plates 23a by means of the arm pivot pin 34 and is positioned between the top arms 31, as further illustrated in FIG. 2. A bottom pulley 42 is rotatably fitted to the extending end of the bottom arm 40 by means of a bottom pulley pin 43 and in a preferred embodiment of the invention, a bottom arm sleeve 41 is mounted on the extending end of the bottom arm 40 and receives both the bottom pulley 42 and the bottom pulley pin 43, as illustrated in FIG. 2. As further illustrated in FIG. 2, a flexible arm connector 44 is disposed between the deployed top arms 31 and bottom arm 40 by means of a top arm eye 45 and a bottom arm eye 46, which receive the ends of the arm connector 44, respectively, in order to prevent the bottom arm 40 from extending beyond a predetermined position with respect to the top arms 31. Furthermore, the cable 53 extends from fixed attachment to the compartment mount cleat 19 attached to the secondary compartment bottom 14 of the secondary compartment 12, around the top pulley 36 and the bottom pulley 42, to a cable eye 52, which is bolted or otherwise fixedly attached to the bottom arm 40, as further illustrated in FIG. 2. In a preferred embodiment of the invention, the traveling block eye 49 of a traveling block pulley 51, which is rotatably mounted on a traveling block 48 by means of a traveling block pin 50, receives that portion of the cable 53 which extends between the bottom pulley 42 and the cable eye 52. A pair of tire chains 54 are joined at each end by an outside spacer 55 and an inside spacer 56 and the inside spacer 56 is, in turn, attached to the traveling block 48 by means of a spacer connector 65, as illustrated in FIG. 2. Each of the tire chains 54 is characterized by a chain mat 57, which is wider than the rear tires 63 of the truck 59 and is adapted to be traversed by the rear tires 63 to operate the truck dumping and unloading apparatus 1, as hereinafter further described.

Referring again to FIGS. 1–4 of the drawings, when the truck dumping and unloading apparatus 1 is in the traveling configuration as illustrated in FIGS. 1 and 3, the tailgate 20 is pivoted upwardly on the tailgate pivot pin 20a, the top arms 31 and the bottom arm 40 are also pivoted upwardly on the arm pivot pin 34 in substantially vertical, aligned configuration and an arm retaining pin 21 is inserted through the retaining pin holes 39, provided in the parallel bracket plates 23a, as illustrated in FIG. 2, to maintain the top arms 31 and the bottom arm 40 in folded, travel configuration. The tailgate 20 remains upward standing on the tailgate pivot pin 20a to retain the double-member sled 2 securely in the bed 61 of the truck 59. Moreover, the tire chains 54 are deployed upwardly and the outside spacer 55 is suspended from a retainer or hook (not illustrated) which is attached to the tailgate 20 or the primary compartment 3 of the double-member sled 2, in order to conveniently retain the tire chains 54 in traveling configuration while the truck 59 is in motion. When it is desired to deploy the sled guide 22 into the operational, deployed configuration illustrated in FIGS. 2, 4 and 9, the two adjusting slot bolts 28 are initially inserted in the parallel, oppositely-disposed adjusting slots 27, located in the parallel bracket plates 23a, the nuts 26 are tightened on the slot bolts 28 and the arm retaining pin 21 is removed from the companion retaining pin hole 39. The top arms 31 and bottom arm 40 are then allowed to pivot downwardly on the arm pivot pin 34 into the position illustrated in FIGS. 2 and 4, wherein the top arms 31 are seated against the heads of the two adjusting slot bolts 28. Further adjustment of the bottom arm 40 with respect to the guide bracket 23 can be effected by reinserting the arm retaining pin 21 through a selected one of the guide bracket adjusting holes 29 in the bracket plates 23a, to stabilize the bottom arms 40 at a selected angle with respect to the bracket plates 23a. The bottom arm 40 normally remains at a constant angle of deployment with respect to the top arms 31 by operation of the flexible arm connector 44.

In operation, and referring again to FIGS. 1–5 and 6A–6E, when it is desired to use the truck dumping and unloading apparatus 1 to dump a load of trash, garbage or refuse on the road surface 66, the sled guide 22 is initially deployed as illustrated in FIGS. 2, 4 and 6A, as heretofore described. The truck 59 is then operated in reverse gear in the direction of the arrow as illustrated in FIG. 6A, to locate the rear tires 63 over the outside spacer 55 and onto the chain mat 57 of each of the tire chains 54. Since the tailgate 20 has been lowered on the tailgate pivot pin 20a, both the primary compartment 3 and the secondary compartment 12 of the double member sled 2 are forced rearwardly on the panel rollers 8 and the secondary compartment rollers 16, toward the top arm rollers 37, by tension in the cable 53. Continued movement of the truck 59 in reverse gear with the rear tires 63 further traversing the tire chains 54, locates the inside bottom panel 5 of the primary compartment 3 on the top arm rollers 37 and positions the double-member sled 2 in the configuration illustrated in FIG. 6B, where the outside bottom panel 6 is opened by gravity to dump refuse 78 from inside the primary compartment 3. Automatic deployment of both the inside bottom panel 5 and the outside bottom panel 6 downwardly is effected by means of the panel divider hinge 7 and the panel mount hinges 11, as the double-member sled 2 moves into the configuration illustrated in FIG. 6C. Still further movement of the truck 59 rearwardly causes the entire double-member sled 2 to pivot downwardly from the top arm rollers 37 to dump the refuse 78, both from the primary compartment 3 and secondary compartment 12, as illustrated in FIG. 6D. As further illustrated in FIG. 6E, additional movement of the rear tires 63 rearwardly on the tire chains 54 approximately to the inside spacer 56, causes still further movement of the double-member sled 2 rearwardly by operation of the tension in the cable 53. This continued motion of the double-member sled 2 causes the primary compartment 3 to pivot forwardly in the direction of the arrow and the pins 4a to traverse the curved slots 15, located in the primary compartment sides 4 of the primary compartment 3. This action completes dumping of the refuse 78 from both the primary compartment 3 and the secondary compartment 12 of the double member sled 2 and the double member sled 2 can then be manually reloaded on the bed 61 of the truck 59 as the truck 59 moves forwardly and the rear tires 63 roll from contact with the tire chains 54.

In yet another alternative embodiment of this invention, the truck dumping and unloading apparatus 1 can be characterized by an open-front, single-member sled 73, as illustrated in FIGS. 7A–7C of the drawings. The single member sled 73 is characterized by a generally rectangular-shaped sled frame 74, provided with a truncated sled bevel 75 on the front face thereof, with sled rollers 76 and a bevel roller 77 fitted in spaced relationship to the sled frame 74, as illustrated. The sled guide 22 is mounted on the rear bumper 62 of the truck 59, as heretofore described, and the truck dumping and unloading apparatus 1 is operated in the same manner as described above, responsive to rearward movement of the pick-up truck 59. Accordingly, as illustrated in FIG. 7B, the single-member sled 73 is caused to roll rearwardly on the bed 61 of the truck 59, responsive to rearward movement of the pick-up truck 59 and rolling traversal of the rear tires 63 along the tire chains 54. When the single-member sled 73 reaches a point of pivot on the top arm rollers 37 as illustrated in FIG. 7C, the single member sled 73 pivots downwardly in the direction of the arrow, such that the forward bevel roller 77 touches the road surface 66 and the refuse 78 is dumped from the open end of the single member sled 73, as illustrated. As in the case of the truck dumping and unloading apparatus 1 illustrated in FIGS. 6A–6E, the single-member sled 73 is manually reloaded on the bed 61 of the truck 59, responsive to forward movement of the truck 59, such that the rear tires 63 roll from the tire chains 54. In a preferred embodiment of this aspect of the invention, a pair of spaced cleats 47 are secured to the bottom panel of the single member sled 73, as illustrated in FIGS. 7C and 8, in order to engage the arm extensions 35 when the truck 59 is moved forwardly from contact with the tire chains 54, as the single member sled 73 is located in the configuration illustrated in FIG. 7C. This engagement prevents the single member sled 73 from falling of the bed 61 of the truck 59 during the sled recovery step.

It will be appreciated by those skilled in the art that the various embodiments of the truck dumping and unloading apparatus 1 of this invention may be utilized in trash, garbage and refuse dumping operations using various types of flatbed trucks and pick-up trucks. The invention is characterized by convenience and flexibility, in that a wide variety of refuse can be hauled and dumped in a minimum period of time with minimum labor requirements, by simply backing the supporting vehicle, without the need for winches, gears and similar cable-driving devices.

While the preferred embodiments of the invention have been described above, it will be recognized and understood that various modifications may be made therein and the appended claims are intended to cover all such modifications which may fall within the spirit and scope of the invention.

Having described my invention with the particularity set forth above, what is claimed is:

1. A truck dumping and unloading apparatus comprising sled means adapted for carrying refuse, said sled means carried by the bed of the truck; sled guide means carried by the truck rearwardly of said sled means; friction means adapted for selective deployment on the truck in non-functional configuration and on the road surface substantially in alignment with the rear wheels of the truck in functional configuration, and connecting means having one end attached to said friction means, said connecting means engaging said sled guide means and the opposite end of said connecting means attached to said sled means, whereby operation of the truck in reverse causes the tires thereof to traverse said friction means, tension said connecting means and displace said sled means rearwardly in the bed of the truck to said sled guide means, for emptying the contents of said sled means.

2. The truck dumping and unloading apparatus of claim 1 wherein said sled means further comprises a single member sled having a front bevel, a pair of spaced bevel rollers rotatably carried by said single member sled at the top of said front bevel, a first pair of spaced sled rollers rotatably carried by said single member sled at the bottom of said front bevel and a second pair of spaced sled rollers rotatably carried by said single member sled in spaced relationship with respect to said first pair of spaced sled rollers, whereby when said first pair of spaced sled rollers engage said sled guide means and the center of gravity of said single member sled extends beyond said sled guide means, said single member sled tilts and said bevel roller engages the road surface to empty the contents of said single member sled responsive to rearward travel of said single member sled along the truck bed.

3. The truck dumping and unloading apparatus of claim 1 wherein said sled guide means further comprises a pair of top arms pivotally carried by the truck; a pair of top arm rollers carried by said top arms, respectively, a top pulley rotatably carried by said top arms between said top arm rollers; a bottom arm pivotally carried by the truck and a bottom pulley rotatably carried by said bottom arm, wherein said bottom pulley is disposed beneath said top pulley in substantially vertical relationship for engaging said connecting means when said top arms and said bottom arm are deployed in functional configuration and said top arm rollers are adapted to receive said sled means responsive to rearward travel of said sled means on the truck bed.

4. The truck dumping and unloading apparatus of claim 1 wherein:
(a) said sled means further comprises a single member sled having a front bevel, a pair of spaced bevel rollers rotatably carried by said single member sled at the top of said front bevel, a first pair of spaced sled rollers rotatably carried by said single member sled at the bottom of said front bevel and a second pair of spaced sled rollers rotatably carried by said single member sled in spaced relationship with respect to said first pair of spaced sled rollers, whereby when said first pair of spaced sled rollers engage said sled guide means and the center of gravity of said single member sled extends beyond said sled guide means, said single member sled tilts and said bevel roller engages the road surface to empty the contents of said single member sled responsive to rearward travel of said single member sled along the truck bed; and
(b) said sled guide means further comprises a pair of top arms pivotally carried by the truck., a pair of top arm rollers carried by said top arms, respectively, a top pulley rotatably carried by said top arms between said top arm rollers; a bottom arm pivotally carried by the truck and a bottom pulley rotatably carried by the said bottom arm, wherein said bottom pulley is disposed beneath said top pulley in substantially vertical relationship for engaging said connecting means when said top arms and said bottom arm are deployed in functional configuration and said top arm rollers are adapted to receive said single member sled responsive to rearward travel of said single member sled along the truck bed.

5. The truck dumping and unloading apparatus of claim 1 wherein said friction means further comprises a pair of friction mats and at least one spacer spacing said friction mats in substantially parallel relationship when said friction mats are disposed in said functional configuration.

6. The truck dumping and unloading apparatus of claim 5 wherein said at least one spacer further comprises a pair of spacers spanning the distance between the rear wheels of the truck, said spacers connected to the ends of said friction mats, respectively.

7. The truck dumping and unloading apparatus of claim 5 wherein said sled means further comprises a single member sled having a front bevel, a pair of spaced bevel rollers rotatably carried by said single member sled at the top of said front bevel, a first pair of spaced sled rollers rotatably carried by said single member sled at the bottom of said front bevel and a second pair of spaced sled rollers rotatably carried by said single member sled in spaced relationship with respect to said first pair of spaced sled rollers, whereby when said first pair of spaced sled rollers engage said sled guide means and the center of gravity of said single member sled extends beyond said sled guide means, said single member sled tilts and said bevel roller engages the road surface to empty the contents of said single member sled responsive to rearward travel of said single member sled along the truck bed.

8. The truck dumping and unloading apparatus of claim 5 wherein said sled guide means further comprises a pair of top arms pivotally carried by the truck; a pair of top arm rollers carried by said top arms, respectively, a top pulley rotatably carried by said top arms between said top arm rollers; a bottom arm pivotally carried by the truck and a bottom pulley rotatably carried by said bottom arm, wherein said bottom pulley is disposed beneath said top pulley in substantially vertical relationship for engaging said connecting means when said top arms and said bottom arm are deployed in functional configuration and said top arm rollers are adapted to receive said sled means responsive to rearward travel of said sled means along the truck bed.

9. The truck dumping and unloading apparatus of claim 1 wherein:
(a) said sled means further comprises a single member sled having a front bevel, a pair of spaced bevel rollers rotatably carried by said single member sled at the top of said front bevel, a first pair of spaced sled rollers rotatably carried by said single member sled at the bottom of said front bevel and a second pair of spaced sled rollers rotatably carried by said single member sled in spaced relationship with respect to said first pair of spaced sled rollers, whereby when said first pair of spaced sled rollers engage said sled guide means and the center of gravity of said single member sled extends beyond said sled guide means, said single member sled tilts and said bevel roller engages the road surface to empty the contents of said single member sled responsive to rearward travel of said single member sled along the truck bed;
(b) said sled guide means further comprises a pair of top arms pivotally carried by the truck; a pair of top arm rollers carried by said top arms, respectively, a top pulley rotatably carried by said top arms between said top arm rollers; a bottom arm pivotally carried by the truck and a bottom pulley rotatably carried by said bottom arm, wherein said bottom pulley is disposed beneath said top pulley in substantially vertical relationship for engaging said connecting means when said top arms and said bottom arm are deployed in functional configuration and said top arm rollers are adapted to receive said single member sled responsive to rearward travel of said single member sled along the truck bed; and
(c) said friction means further comprises a pair of friction mats and at least one spacer spacing said friction mats in substantially parallel relationship when said friction mats are disposed in said functional configuration.

10. The truck dumping and unloading apparatus of claim 9 wherein said at least one spacer further comprises a pair of spacers spanning the distance between the rear wheels of the truck, said spacers connected to the ends of said friction mats, respectively.

11. The truck dumping and unloading apparatus of claim 10 wherein said connecting means further comprises a cable.

12. The truck dumping and unloading apparatus of claim 1 wherein said sled means further comprises a double-member sled having a primary compartment and a secondary compartment pivotally attached to and communicating internally with said primary compartment and further comprising at least one bottom panel hingedly carried by said primary compartment, said bottom panel adapted to open responsive to rearward travel of said primary compartment and said secondary compartment on the truck bed.

13. The truck dumping and unloading apparatus of claim 12 wherein said sled guide means further comprises a pair of top arms pivotally carried by the truck; a pair of top arm rollers carried by said top arms, respectively, a top pulley rotatably carried by said top arms between said top arm rollers; a bottom arm pivotally carried by the truck and a bottom pulley rotatably carried by said bottom arm, wherein said bottom pulley is disposed beneath said top pulley in substantially vertical relationship for engaging said connecting means when said top arms and said bottom arm are deployed in functional configuration and said top arm rollers are adapted to receive said double-member sled responsive to rearward travel of said double-member sled on the truck bed.

14. The truck dumping and unloading apparatus of claim 12 wherein said friction means further comprises a pair of friction mats and at least one spacer spacing said friction mats in substantially parallel relationship when said friction mats are disposed in said functional configuration.

15. The truck dumping and unloading apparatus of claim 12 wherein:
(a) said sled guide means further comprises a pair of top arms pivotally carried by the truck; a pair of top arm rollers carried by said top arms, respectively, a top pulley rotatably carried by said top arms between said top arm rollers; a bottom arm pivotally carried by the truck and a bottom pulley rotatably carried by said bottom arm, wherein said bottom pulley is disposed beneath said top pulley in substantially vertical relationship for engaging said connecting means when said top arms and said bottom arm are deployed in functional configuration and said top arm rollers are adapted to receive said double-member sled responsive to rearward travel of said double-member sled on the truck bed; and
(b) said friction means further comprises a pair of friction mats and at least one spacer spacing said friction mats in substantially parallel relationship when said friction mats are disposed in said functional configuration.

16. The truck dumping and unloading apparatus of claim 15 wherein said connecting means further comprises a flexible cable.

17. The truck dumping and unloading apparatus of claim 16 wherein said at least one spacer further comprises a pair of spacers spanning the distance between the rear wheels of the truck, said spacers connected to the ends of said friction mats, respectively.

18. A truck dumping and unloading apparatus comprising a single member sled having a front bevel and a plurality of rollers engaging the truck bed, said single member sled adapted for carrying refuse; sled guide means carried by the truck rearwardly of said single member sled, for receiving and tilting said single member sled; a pair of friction mats adapted for selective deployment on the truck in non-functional configuration and on the road surface substantially in alignment with the rear wheels of the truck in functional configuration; a flexible cable having one end attached to said sled guide means and the opposite end of said cable means attached to said single member sled; and a traveling block carried by said cable and said friction mats, whereby operation of the truck in reverse causes the tires thereof to traverse said friction mats and said traveling block to traverse and tension said cable and displace said single member sled rearwardly in the truck to said sled guide means, for emptying the contents of said single member sled responsive to tilting of said front bevel of said single member sled toward the road surface.

19. The truck dumping and unloading apparatus of claim 18 wherein said sled guide means further comprises a pair of top arms pivotally carried by the truck; a pair of top arm rollers carried by said top arms, respectively, a top pulley rotatably carried by said top arms between said top arm rollers; a bottom rm pivotally carried by the truck and a bottom pulley rotatably carried by the said bottom arm, wherein said bottom pulley is disposed beneath said top pulley in substantially vertical relationship for engaging said cable when said top arms and said bottom arm are deployed in functional configuration and said top arm rollers are adapted to receive said single member sled responsive to rearward travel of said single member sled along the truck bed.

20. The truck dumping and unloading apparatus of claim 19 further comprising a pair of spacers spanning the distance between the rear wheels of the truck, said spacers connected to the ends of said friction mats, respectively.

* * * * *